(Model.) 2 Sheets—Sheet 1
W. D. EWART.
Metallic Drive Belt.
No. 242,905. Patented June 14, 1881.
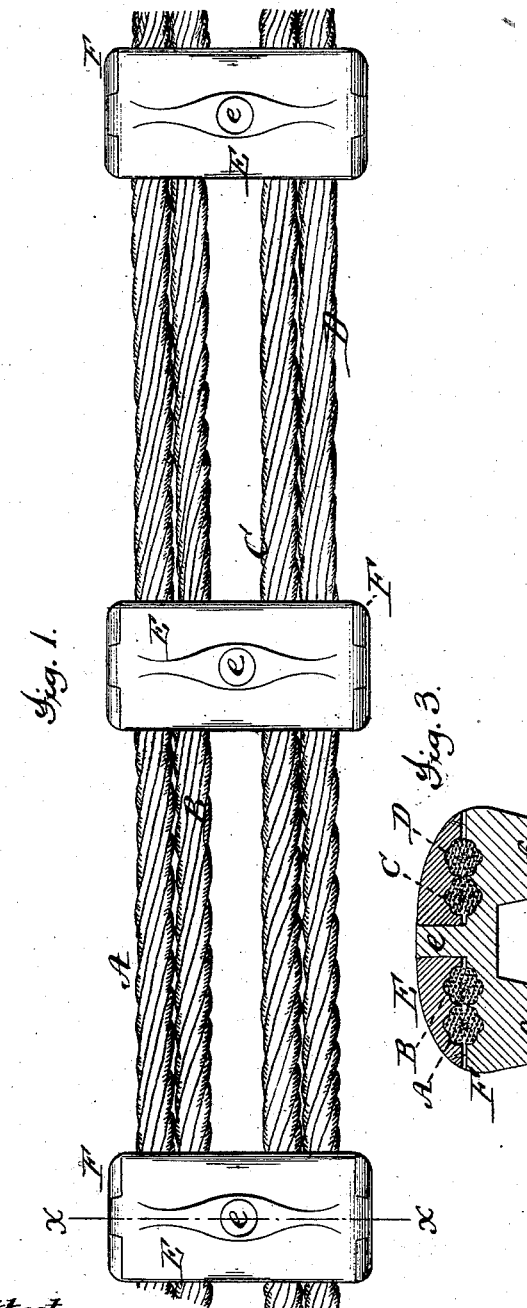
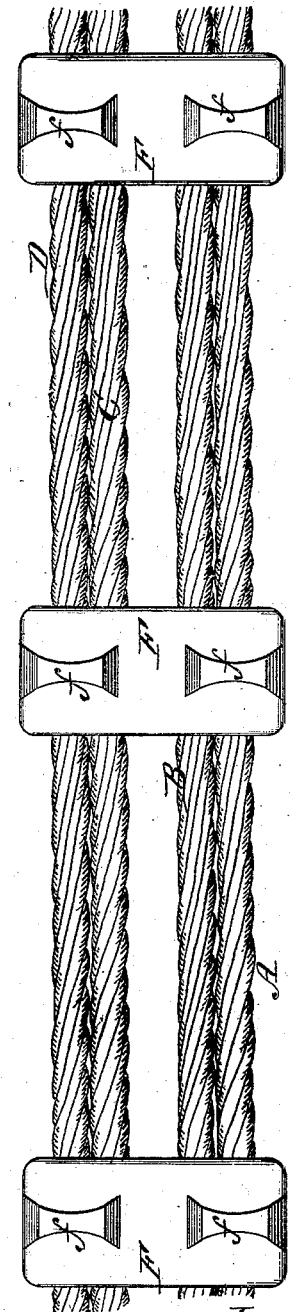

(Model.) 2 Sheets—Sheet 2.
W. D. EWART.
Metallic Drive Belt.
No. 242,905. Patented June 14, 1881.
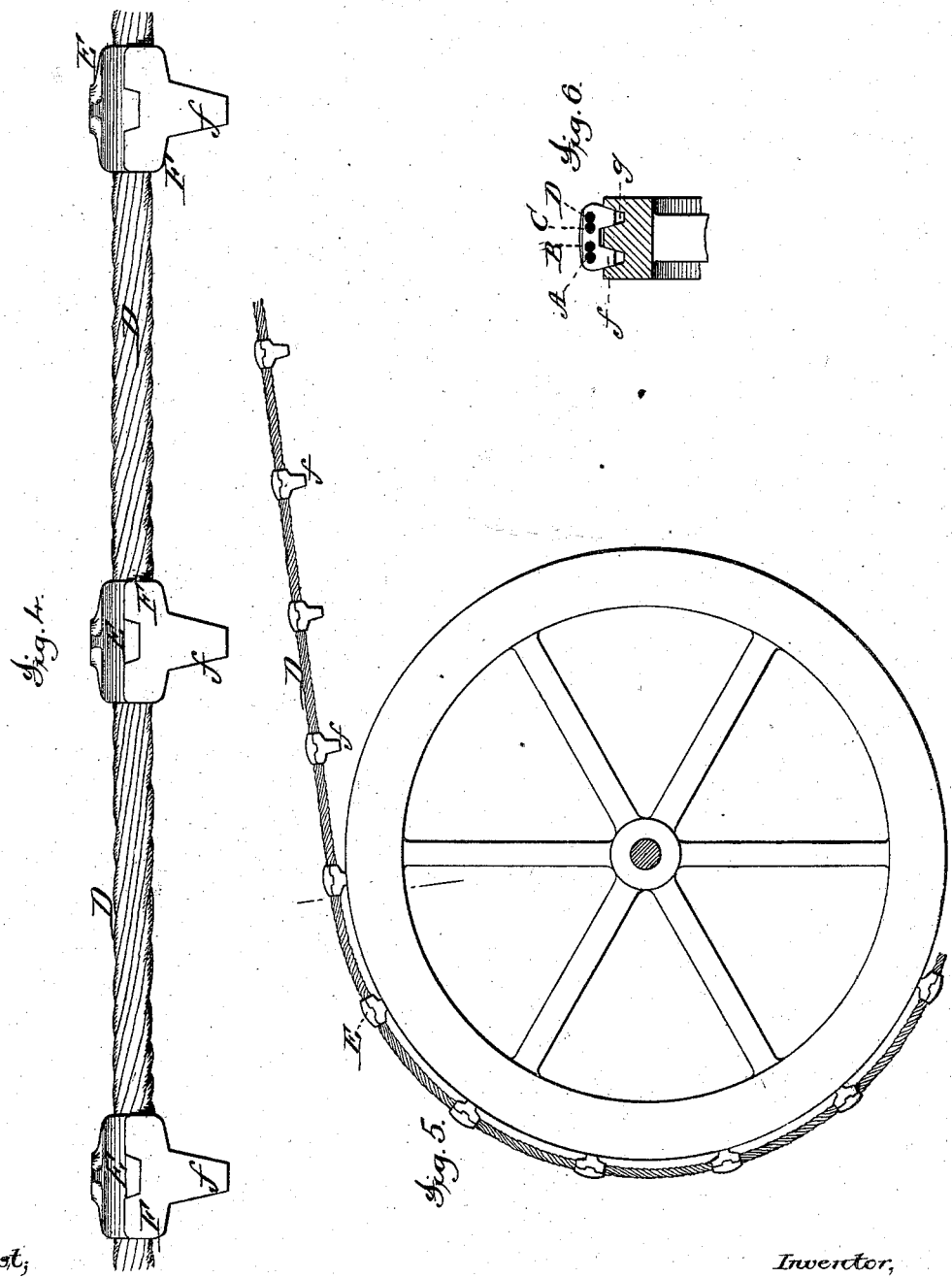

UNITED STATES PATENT OFFICE.

WILLIAM D. EWART, OF CHICAGO, ILLINOIS.

METALLIC DRIVE-BELT.

SPECIFICATION forming part of Letters Patent No. 242,905, dated June 14, 1881.

Application filed March 10, 1881. (Model.)

*To all whom it may concern:*

Be it known that I, WILLIAM D. EWART, of Chicago, in the county of Cook and State of Illinois, have invented a new and useful Improvement in Metallic Drive-Belts; and I do hereby declare that the following is a full and exact description thereof, reference being had to the accompanying drawings, making part of this specification.

Previous to my invention it has been customary to employ wire cable or rope for purposes similar to that which ordinary belting is used—viz., for the purposes of transmitting power and motion from one wheel or pulley to another through the medium of an endless band passing from one wheel to the other and partially around the periphery of each—this class of (metallic rope) belting or banding being usually employed, however, in cases where the wheels over which the belting passes are of comparatively large size circumferentially, since the wire rope does not possess that extreme degree of flexibility of the ordinary leather or rubber belting which renders the latter capable of running properly over very small pulleys.

In the use of wire-cable belting in connection with metallic wheels it has heretofore been necessary to employ wheels the peripheries of which were provided with some sort of highly elastic and comparatively soft and pliable material, such as leather, rubber, rawhide, &c., in order that a surface should be presented for contact with such belting into which the metallic surface of the belting could slightly embed itself, and thus take hold of the wheel's periphery with sufficient tenacity (or with a sufficient tractive adhesion) to accomplish the desired purposes of banded wheels or pulleys.

The construction of metal pulleys, in the heretofore-practiced manner, with some sort of material applied to their faces to adapt them for use in conjunction with metallic cable bands involves considerable expense, both on account of the first cost of making and the perishableness of the thus prepared working faces, and the cost increases in a rapid ratio as the size of the wheel is increased.

My invention has for its main objects to not only dispense with every sort of softer facing for metal pulleys designed for use in conjunction with wire cable, but also to provide a method of application of wire-cable belts by which the necessity of increasing the size of the pulleys in proportion to the strength of the belt and the work to be done may be entirely avoided; and to these main ends and objects my invention consists in the combination, with a wire rope, of rigid tapering lugs, securely attached to said band at suitable intervals through its length, and adapted to work in and engage with the sides of a V-shaped groove in the periphery of a metal pulley or wheel, all as will be hereinafter more fully explained; and my invention further consists in a wire-rope belt composed of a series of cables or bands arranged side by side and provided with tapering rigid lugs firmly secured thereto, and adapted to engage with V-shaped grooves in the metal pulleys over which the belt is designed to pass, whereby I am enabled to provide for use metal belts or wire-rope driving-bands of various degrees of strength without increasing the size of the pulley, all as will be hereinafter more fully explained.

To enable those skilled in the art to make and use my invention, I will now proceed to more fully describe it, referring by letters to the accompanying drawings, forming a part of this specification, and in which—

Figure 1 is a view of the outer face of a duplex wire-rope belt embracing my invention. Fig. 2 is a similar view of the inner face, or that side which runs nearer the faces of the pulleys. Fig. 3 is a cross-section of the same at the line *x x* of Fig. 1, and Fig. 4 is an edge view of the belt. At Fig. 5 is shown in edge view, and at Fig. 6 in cross-section, a metal pulley adapted to the use of and having applied to it the improved metallic drive-belt shown in the preceding figures just above alluded to.

In the several figures the same part, wherever it may occur, will be found designated by the same letter of reference.

A, B, C, and D are four round wire ropes or cables, which are arranged in pairs, as shown, so that A and B form, as it were, one flattened cable-band, and C and D another similar band, the two bands thus formed being separated, as shown, a distance nearly equal to the space occupied by two of the said wire ropes when placed side by side and in contact with each other. At suitable intervals along these wire cables are arranged thereon and firmly secured thereto cast-metal devices, (made preferably of malleable cast-iron,) each of which is composed, as shown, of two pieces, E and F, which are adapted to be secured together by a lug, e, on the lower one, F, which passes through a hole in the upper piece, E, and is riveted therein. The conformations of the castings E and F are such that when secured together as seen said castings securely clamp between them and hold in the proper relative positions (widthwise of the belt) the four ropes A, B, C, and D, while at the same time the said clamping devices E and F are rendered incapable of any movement (lengthwise of the belt) upon said ropes. The lower casting, F, is formed or provided with two narrow tapering-edged lugs, $f$ $f$, which are designed and adapted to fit and work in two V-shaped grooves, $g$ $g$, made in the periphery of each wheel on which the belt is to run. (See particularly Fig. 6.) These tapering lugs should be made quite narrow, so as to have the shortest practical bearing on the sides of the grooves $g$ in the direction of the length of said grooves, and should, of course, have a taper similar to that of the tapered surfaces of the said grooves, and should be of a length or should project from the casting F to an extent such that there can be no danger of the ends of said lugs $f$ coming into contact with the bottoms of said grooves $g$, and thus interfering with the proper wedge-like action of said lugs in said grooves.

The operation of the belt shown, in conjunction with wheels having V-shaped grooves in their peripheries, as illustrated, will be readily understood. The narrow-edged and tapering lugs $f$ take hold in the grooves $g$ by reason of their edges being wedged or jammed hard against the similarly-tapered sides of the grooves $g$. At the same time they will easily let go their gripe or hold as the belt runs off from the periphery of the wheel.

It will be understood that by the employment of the devices $f$, or their equivalents, firmly secured to one or more wire ropes or cables, I am enabled to successfully run an endless band or belt composed of such rope upon metal-faced wheels, with a working capacity in the contrivance thus produced (for transmitting power and motion) equal to or greater than that realized by the use of such rope working over metal wheels having their peripheries grooved and clothed with rawhide or other pliable material; and it will be seen that I at the same time avoid by my invention all the expense of clothing the faces of metal wheels, as heretofore necessary in the use of wire or other metallic drive-bands.

Of course, so far as the first part of my invention is concerned, a single wire rope in lieu of a series arranged side by side may be used; and the casting clamped thereto, and carrying the devices adapted to engage with the grooves of the wheels, may have only one lug each in lieu of two, as shown, or may have more than two, the periphery of each wheel being in any case provided with a groove for each lug that each casting may be provided with. By the use of a number of wire ropes, having combined therewith clamping devices E F, I am enabled to increase the strength and working capacity of the belt, as may be desired, without at all decreasing its flexibility, as in the case of increasing the strength by enlarging the diameter of the wire rope used, as it has heretofore been the practice to do; and it will be understood, of course, that the wire ropes, when a series are used, need not be arranged in pairs touching each other, as shown, but may be otherwise arranged, widthwise of the belt, as may be deemed most expedient.

I am aware that it is not original with me to use tapering lugs on every sort of endless-belting device adapted to engage with V-shaped grooves in the metal faces of wheels; but, Having so fully explained the several features of my invention that those skilled in the art can understand and practice the latter, what I claim as new, and desire to secure by Letters Patent, is—

1. In combination with a wire rope or cable, a series of tapering metal lugs adapted to engage with V-shaped grooves of metal-faced wheels, all substantially as and for the purposes set forth.

2. The combination of a series of round wire ropes with a series of tapering lugs firmly secured to said wire ropes, whereby metallic drive-belts may be produced of different degrees of strength and with the same degree of flexibility, as set forth.

In witness whereof I have hereunto set my hand this 15th day of February, 1881.

WILLIAM D. EWART.

In presence of—
H. JANVIER,
DANIEL H. STONE.